UNITED STATES PATENT OFFICE.

LOUIS CLÉMENT, OF PARIS, AND CLERY RIVIÈRE, OF PANTIN, NEAR PARIS, FRANCE, ASSIGNORS TO ACTIEN GESELLSCHAFT FÜR ANILIN FABRIKATION, OF BERLIN, GERMANY.

DERIVATIVES OF CELLULOSE CONTAINING THE RESIDUE OF AN ORGANIC ACID AND NITROGEN AND PROCESS OF MAKING SAME.

1,168,164. Specification of Letters Patent. Patented Jan. 11, 1916.

No Drawing. Application filed August 21, 1912, Serial No. 716,324. Renewed June 19, 1915. Serial No. 35,126.

*To all whom it may concern:*

Be it known that we, LOUIS CLÉMENT and CLERY RIVIÈRE, citizens of the French Republic, residing at Paris, French Republic, and Pantin, near Paris, French Republic, our post-office addresses being, respectively, 231 Rue Lafayette, Paris, and 6 Rue Etienne-Marcel, Pantin, near Paris, French Republic, have invented certain new and useful Improvements in Derivatives of Cellulose Containing the Residue of an Organic Acid and Nitrogen and Processes of Making Same, of which the following is a specification.

According to English Patent 19107/1906 aceto-nitrates of cellulose are to be obtained by acting with acetic anhydrid, with or without the addition of a condensing medium, upon collodion-cotton or other nitrocellulose. Further investigations (compare *Berichte der Deutschen Chemischen Gesellschaft*, vol. 40, p. 903 and vol. 41, p. 1837) have shown that the indications given in this patent, to a great extent are misleading it having been stated that collodion-cotton or other nitrocellulose, which are soluble in glacial acetic or acetic anhydrid, cannot be transformed into aceto-nitrates by the action of acetic anhydrid without the intervention of a condensing medium. Moreover the products, which may be obtained by acting with acetic anhydrid in conjunction with sulfuric acid upon collodion-cotton have never found industrial application, a fact which is not surprising seeing that these old aceto-nitrates are very unstable and easily split of acetic acid (compare *Berichte der Deutschen Chemischen Gesellschaft* vol. 40, p. 904).

Now our invention is based on the very surprising observation that very valuable derivatives of cellulose containing at the same time nitrogen and the residue of an organic acid, can be obtained by acting with acetic anhydrid or another organic acid anhydrid in the presence of a condensing medium upon those derivatives of cellulose, which contain nitrogen and may be obtained by the action of a nitrating acid, such as nitric acid or a mixture of nitric acid with sulfuric acid containing more than 25 per cent. of water. These derivatives (compare "Cellulose S" described in British Patent No. 3,645 of 1907 and Lunge, Researches on nitrocellulose, reported in the *Journal of the American Chemical Society*, vol. 23, No. 8, 1901) possess the appearance of cellulose and are insoluble in organic acids, in acetic anhydrid, in hydrochloric acid, in nitric acid, in phenols, in solutions of alkaline hydroxids, in alcohol +ether and in acetone; they may perhaps be held to be nitro-derivatives but differ very distinctly on account of their said properties from the nitrocelluloses properly so called and also from the products indicated by Crane and Joyce, *J. S. Ch. Ind. 1910*, vol. 29, page 540.

In order to prepare a suitable parent material we proceed for instance as follows: Cellulose of a suitable kind, for instance bleached cotton, is introduced into a mixture of concentrated sulfuric acid and of concentrated nitric acid which contains 26% of sulfuric acid, 43% of nitric acid and 31% of water; the mass is worked during a short time say 10 minutes, at ordinary or a slightly raised temperature whereupon the said mixture is eliminated by whirling the mass in a centrifugal machine, then the cotton is thoroughly washed and dried. Thus is obtained a specifically altered cellulose without an essential modification of its appearance but which contains a small quantity of nitrogen, possesses the above indicated properties, and is not as easily inflammable as nitro-cellulose.

Among the great number of condensing agents we name for instance sulfuric acid, nitric acid, hydrohalogen acids, chlorin, bromin, chlorin+bromin, chloro-iodin, a sulfonic acid or a sulfinic acid, zinc chlorid, etc. Furthermore the reaction may be performed with the intervention of heat, for instance at 50–70°, but it may also be carried out at a lower temperature. A suitable solvent or diluent may be added, such as for instance glacial acetic acid, formic acid, tetrachlorethane, benzene, carbon-tetrachlorid, etc.

Whereas according to the old process of the British Patent No. 19,107 of 1906 a great percentage of nitrogen is first introduced into the cellulose, a considerable part of which is afterward eliminated and substituted by the residue of acetic acid, in our new process the relatively very small quantity of nitrogen contained in our parent material remains essentially unaltered in the final product. Furthermore our new products containing nitrogen and the residue of an organic acid, which are very stable and which must be regarded as a special kind of nitro-acidyl derivatives of cellulose, and more especially the products derived from acetic anhydrid, possess excellent properties for industrial purposes; they are most adapted for the manufacture of practically non-inflammable films, of celluloid-like masses, of lacquers and of varnishes.

The new hydrolized nitro-acidyl-derivatives are soluble in acetone, chloroform, methylene-chlorid, tetrachlorethane, methylformate, ethylacetate, and glacial acetic acid.

The following examples serve to illustrate our invention the parts being by weight.

Example 1: 100 parts of cellulose containing nitrogen being obtained by the action of a mixture of nitric and sulfuric acids containing 34% of water, are introduced into a mixture of 400 parts of glacial acetic acid, 200 parts of acetic anhydrid and 3 parts of sulfuric acid. The mass is allowed to react at ordinary temperature or it may be slightly warmed until a clear solution results. The product of reaction may be isolated in the usual manner for instance by pouring the mass into water; it may be hydrolyzed if desired. Instead of cellulose derivatives resulting from a nitrating acid containing 34% of water one may also use cellulose which has undergone for instance a treatment with a mixture of 34.4% of $H_2SO_4$, 37.23% $HNO_3$ and 28.37% $H_2O$ during 10-20 hours at a temperature of 15-18° C. (compare Lunge, *Researches on Nitro-Cellulose*). This parent material may be acetylized according to the foregoing example, the process requiring less time. According to the method indicated in this example also products may be acidylized which are obtained according to Schneider's English Patent 3645/1907 by means of a nitrating acid containing more than 25% of water, for instance a cellulose derivative contatining 2½% of nitrogen.

Example 2: 100 parts of cellulose containing 1½-2% nitrogen are acetylized by means of 31 parts of benzene sulfonic acid and of a mixture of 400 parts of glacial acetic acid and 500 parts of acetic anhydrid; the temperature may be kept at about 40-60°, so that the reaction will be finished in about 10-20 hours. From the resulting solution the product is precipitated in the known manner; it may be subjected to hydrolysis if desired. Instead of the benzene sulfonic acid employed in this example there may be used for instance the corresponding sulfinic acid; while the other ingredients may be retained in the same proportions the quantity of the benzene sulfinic acid may be diminished to 24 parts.

Example 3: 100 parts of a specifically treated cellulose as indicated above and containing 2-3% of nitrogen, are brought into reaction with a mixture of 400 parts of glacial acetic acid, 500 parts of acetic anhydrid and 14 parts of hydrobromic acid. The mass may be allowed to stand at ordinary temperature; thus within about 3 days results a thick and perfectly clear solution. With the intervention of heat, for instance at 40-50° C., the reaction proceeds much quicker. From this clear solution the acetylized product may be precipitated in the known manner, for instance by the addition of water; if desired the product may also be hydrolyzed.

Example 4: 100 parts of a cellulose, which has undergone a preliminary treatment with a mixture of 25% sulfuric acid, 41% of nitric acid and 34% of water during a short time and at ordinary or a slightly raised temperature, are introduced into a mixture of 400 parts of glacial acetic acid, 300 parts of acetic anhydrid and 6 parts of bromin. The mass is then treated at about 50° C. until complete dissolution occurs. The acetylized product thus obtained may be isolated in the usual manner; before or after isolating the product may also be subjected to hydrolysis if it be necessary.

It is obvious to those skilled in the art that our present invention is not limited to the foregoing examples or to the details given therein. Instead of the condensing agents employed in the foregoing examples any other suitable may be employed, for instance phosphoric acid or zinc chlorid. Furthermore the special conditions of reaction, such as the proportions of the ingredients, the temperature of the reacting mass and the duration of the treatment depend to a great extent upon the special nature of the condensing medium as well as of the final product to be obtained; they may also be varied according to the special kind of the cellulose derivative serving as parent material.

The residue of other organic acids may be introduced into our parent material; mixed esters may also be obtained for instance by the action of the mixed anhydrid of acetic and formic acid. As to the hydrolysis of the acidylized product any process suitable for that purpose may be employed.

Now what we claim is,—

1. The hereinbefore-described process for the production of cellulose derivatives containing the residue of an organic acid and nitrogen, which process consists in acting with an acid anhydrid of the fatty series in the presence of a condensing medium upon those lower nitro derivatives of cellulose which possess the appearance of cellulose and are insoluble in organic acid, in acetic anhydrid, in hydrochloric acids, in nitric acid, in phenols, in solutions of alkaline hydroxids, in alcohol+ether, and in acetone.

2. The hereinbefore-described process for the production of cellulose derivatives containing the residue of an organic acid and nitrogen, which process consists in acting with an acid anhydrid of the fatty series in the presence of a condensing medium upon those lower nitro derivatives of cellulose which possess the appearance of cellulose and are insoluble in organic acids, in acetic anhydrid, in hydrochloric acid, in nitric acid, in phenols, in solutions of alkaline hydroxids, in alcohol+ether, and in acetone, and subjecting the products to hydrolysis.

3. The hereinbefore-described process for the production of cellulose derivatives containing the residue of an organic acid and nitrogen, which process consists in acting with acetic anhydrid in the presence of a condensing medium upon those lower nitro derivatives of cellulose which possess the appearance of cellulose and are insoluble in organic acids, in acetic anhydrid, in hydrochloric acid, in nitric acid, in phenols, in solutions of alkaline hydroxids, in alcohol+ether, and in acetone.

4. The hereinbefore-described process for the production of cellulose derivatives containing the residue of an organic acid and nitrogen, which process consists in acting with acetic anhydrid in the presence of a condensing medium upon those lower nitro-derivatives of cellulose which possess the appearance of cellulose and are insoluble in organic acids, in acetic anhydrid, in hydrochloric acid, in nitric acid, in phenols, in solutions of alkaline hydroxids, in alcohol+ether, and in acetone, and subjecting the products to hydrolysis.

5. The hereinbefore-described process for the production of cellulose derivatives containing the residue of an organic acid and nitrogen, which process consists in acting with acetic anhydrid in the presence of a condensing medium with the addition of a suitable liquid upon those lower nitro-derivatives of cellulose which possess the appearance of cellulose and are insoluble in organic acids, acetic anhydrid, in hydrochloric acid, in nitric acid, in phenols, in solutions of alkaline hydroxids, in alcohol+ether, and in acetone, and subjecting the products to hydrolysis.

6. The hereinbefore-described process for the production of cellulose derivatives containing the residue of an organic acid and nitrogen, which process consists in acting with acetic anhydrid in the presence of bromin upon those lower nitro-derivatives of cellulose which possess the appearance of cellulose and are insoluble in organic acids, in acetic anhydrid, in hydrochloric acid, in nitric acid, in phenols, in solutions of alkaline hydroxids, in alcohol+ether, and in acetone.

7. The hereinbefore-described process for the production of cellulose derivatives containing the residue of an organic acid and nitrogen, which process consists in acting with acetic anhydrid in the presence of bromin upon those lower nitro derivatives of cellulose which possess the appearance of cellulose and are insoluble in organic acids, in acetic anhydrid, in hydrochloric acid, in nitric acid, in phenols, in solutions of alkaline hydroxids, in alcohol+ether, and in acetone, and subjecting the products to hydrolysis.

8. The hereinbefore-described process for the production of cellulose derivatives containing the residue of an organic acid and nitrogen, which process consists in acting with acetic anhydrid in the presence of bromin and of a suitable liquid upon those lower nitro derivatives of cellulose which possess the appearance of cellulose and are insoluble in organic acids, in acetic anhydrid, in hydrochloric acid, in nitric acid, in phenols, in solutions of alkaline hydroxids, in alcohol+ether, and in acetone.

9. The hereinbefore-described process for the production of cellulose derivatives containing the residue of an organic acid and nitrogen, which process consists in acting with acetic anhydrid in the presence of bromin and of a suitable liquid upon those lower nitro derivatives of cellulose which possess the appearance of cellulose and are insoluble in organic acids, in acetic anhydrid, in hydrochloric acid, in nitric acid, in phenols, in solutions of alkaline hydroxids, in alcohol+ether, and in acetone, and subjecting the products to hydrolysis.

10. The hereinbefore-described process for the production of cellulose derivatives containing the residue of an organic acid and nitrogen, which process consists in acting with acetic anhydrid in the presence of bromin and of glacial acetic acid upon those lower nitro derivatives of cellulose which possess the appearance of cellulose and are insoluble in organic acids, in acetic anhydrid, in hydrochloric acid, in nitric acid, in phenols, in solutions of alkaline hydroxids, in alcohol+ether and in acetone.

11. The hereinbefore-described process for the production of cellulose derivatives containing the residue of an organic acid and nitrogen, which process consists in acting with acetic anhydrid in the presence of bromin and acetic acid upon those lower nitro derivatives of cellulose which possess the appearance of cellulose and are insoluble in organic acids, in acetic anhydrid, in hydrochloric acid, in nitric acid, in phenols, in solutions of alkaline hydroxids, in alcohol+ether and in acetone, and subjecting the products to hydrolysis.

12. As new articles of manufacture cellulose derivatives containing the residue of an organic acid and nitrogen, which new articles are soluble in acetone, chloroform, methylene chlorid, tetrachlorethane, methyl-formate, ethyl-acetate, glacial acetic acid.

13. As new articles of manufacture cellulose derivatives containing the residue of acetic acid and nitrogen which new articles are soluble in acetone, chloroform, methylene-chlorid, tetrachlorethane, methylformate, ethylacetate, glacial acetic acid.

14. As new articles of manufacture cellulose derivatives containing the residue of acetic acid and 0.5–3.5 per cent. of nitrogen, which new articles are soluble in acetone, chloroform, methylenechlorid, tetrachlorethane, methylformate, ethylacetate, glacial acetic acid.

15. As new articles of manufacture cellulose derivatives containing the residue of acetic acid and 2 per cent. of nitrogen, which new articles are soluble in acetone, chloroform, methylene-chlorid, tetrachlorethane, methylformate. ethylacetate, glacial acetic acid.

In testimony whereof we have hereunto set our hands in presence of two subscribing witnesses.

LOUIS CLÉMENT.
CLERY RIVIÈRE.

Witnesses:
H. C. COXE,
JOHN BAKER.